(12) United States Patent
Liu

(10) Patent No.: US 12,411,567 B2
(45) Date of Patent: Sep. 9, 2025

(54) TOUCH DISPLAY PANEL INCLUDING COMPENSATION WIRING AND TOUCH DISPLAY DEVICE INCLUDING THE SAME

(71) Applicant: WUHAN CHINA STAR OPTOELECTRONICS SEMICONDUCTOR DISPLAY TECHNOLOGY CO., LTD., Wuhan (CN)

(72) Inventor: Jing Liu, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/384,371

(22) Filed: Oct. 26, 2023

(65) Prior Publication Data

US 2025/0028402 A1    Jan. 23, 2025

(30) Foreign Application Priority Data

Jul. 22, 2023   (CN) .......................... 202310910927.8

(51) Int. Cl.
G06F 3/041   (2006.01)
(52) U.S. Cl.
CPC ................................ G06F 3/0412 (2013.01)

(58) Field of Classification Search
CPC ..................................................... G06F 3/0412
See application file for complete search history.

(56) References Cited

U.S. PATENT DOCUMENTS

| | | | |
|---|---|---|---|
| 2014/0340364 A1* | 11/2014 | Tang | G06F 3/042 345/175 |
| 2019/0165325 A1* | 5/2019 | Lee | H10K 59/8792 |
| 2021/0109616 A1* | 4/2021 | Park | H10K 59/122 |
| 2024/0057458 A1* | 2/2024 | Du | H10K 59/122 |
| 2024/0224775 A1* | 7/2024 | Park | H10K 59/38 |
| 2024/0257698 A1* | 8/2024 | Lee | G06F 21/32 |

* cited by examiner

*Primary Examiner* — Amr A Awad
*Assistant Examiner* — Donna V Bocar
(74) *Attorney, Agent, or Firm* — The Roy Gross Law Firm, LLC; Roy D. Gross

(57) ABSTRACT

A touch display panel and a touch display device are provided, the touch display panel includes a substrate, a touch function layer and a color filter layer, the touch function layer includes first touch wirings and second touch wirings disposed on different layers, and a first region is provided with the first touch wirings and the second touch wirings, the color filter layer includes black matrixes disposed at intervals, the first region is covered by the black matrixes, the touch function layer is further provided with compensation wirings disposed on the first region, and a wiring density of the touch function layer in the first region is in a range of 60% to 90%.

18 Claims, 1 Drawing Sheet

TOUCH DISPLAY PANEL INCLUDING COMPENSATION WIRING AND TOUCH DISPLAY DEVICE INCLUDING THE SAME

CROSS-REFERENCE TO RELATED APPLICATION

This application claims priority to Chinese Patent Application No. 202310910927.8, filed on Jul. 22, 2023, the disclosure of which is incorporated herein by reference in its entirety.

TECHNICAL FIELD

The present disclosure relates to the field of display technologies, and in particular, to a touch display panel and a touch display device.

BACKGROUND

For a touch display panel with a color filter layer, under an off-screen state of the touch display panel, since a first region is only provided with a black matrix of a color filter to shade the light, a shading effect of the black matrix is worse than that of an ink or a polarizer, a wiring of a touch function layer in the first region will reflect a part of ambient light to human eyes to generate dark lines.

Therefore, the existing touch display panel exists a technical problem of dark lines generated in the first region under the off-screen state.

SUMMARY

A touch display panel is provided in embodiments of the present disclosure, including a display region and a non-display region, where the non-display region includes a lower bezel region, the lower bezel region includes a first region and an ink region, the first region is disposed on a side of the ink region facing towards the display region, where the touch display panel includes: a substrate; a display function layer including an array layer, a light-emitting function layer and an encapsulation layer disposed on the substrate; a touch function layer disposed on a side of the display function layer away from the substrate and including first touch wirings and second touch wirings disposed at a different layer than the first touch wirings, and the first region is provided with the first touch wirings and the second touch wirings; and a color filter layer disposed on a side of the touch function layer away from the substrate, where the color filter layer includes black matrixes arranged at intervals, and the first region is covered with the black matrixes; where the touch function layer is further provided with compensation wirings, the compensation wirings are disposed in the first region, and a wiring density of the touch function layer in the first region is in a range of 60% to 90%.

Optionally, in some embodiments of the present disclosure, the touch display panel further includes multiple regions disposed around the first region, where a difference between a wiring density of the touch function layer in each of the multiple regions and the wiring density of the touch function layer in the first region is smaller than 30%, wiring densities of the touch function layer in the multiple regions are in a range of 60% to 90% and are not equal to each other, and the wiring density of the touch function layer in the first region is equal to an average value of the wiring densities of the touch function layer in the multiple regions.

Optionally, in some embodiments of the present disclosure, at least one of the number of wirings, widths of the wirings, or spacing of wirings of the touch function layer in the first region is the same as that of the touch function layer in the multiple regions.

Optionally, in some embodiments of the present disclosure, the multiple regions include a second region, a third region, a fourth region and a fifth region, and a wiring density of the touch function layer in the second region is 70.7%, a wiring density of the touch function layer in the third region is 85.8%, a wiring density of the touch function layer in the fourth region is 73.6%, and a wiring density of the touch function layer in the fifth region is 60%.

Optionally, in some embodiments of the present disclosure, the compensation wirings are disposed at the same layer as the first touch wirings or the second touch wirings.

Optionally, in some embodiments of the present disclosure, two ends of each of the compensation wirings are configured to be in a disconnection state, and the compensation wirings are disposed at intervals with the first touch wirings and the second touch wirings.

Optionally, in some embodiments of the present disclosure, the ink region is provided with an ink layer disposed outside the first region.

Optionally, in some embodiments of the present disclosure, the touch display panel further includes a light blocking layer at least covering the first region.

Optionally, in some embodiments of the present disclosure, a transmittance of the light blocking layer is smaller than that of each of the black matrixes.

A touch display device is provided in the embodiments of the present disclosure, including the touch display panel as described in any one of the above embodiments.

BRIEF DESCRIPTION OF THE DRAWINGS

In order to clearly describe technical solutions in embodiments of the present disclosure, drawings used in the embodiments of the present disclosure will be simply described. Obviously, the drawings descried below are merely some of the embodiments of the present disclosure, based on the drawings, other drawings can be obtained by those skilled in the art without involving creative labors.

DETAILED DESCRIPTION

Technical solutions in embodiments of the present disclosure will be clearly and completely described below in conjunction with accompanying drawings in the embodiments of the present disclosure. Obviously, the described embodiments are merely some of the embodiments of the present disclosure, not all of them. Based on the embodiments in the present disclosure, all other embodiments obtained by those skilled in the art without making creative efforts fall within a scope of protection of the present disclosure. Moreover, it should be understood that the specific embodiments described here are only used to describe and explain the present disclosure, and are not used to limit the present disclosure. In the present disclosure, without any explanation to the contrary, directional terms used herein such as "upper" and "lower" usually refer to the upper and lower positions of a device in an actual use or working state, specifically the direction of the figures of the accompanying drawings, and terms "inner" and "outer" refer to a profile of the device. Additionally, a term "a wiring density of a touch function layer in a region" refers to a ratio of a projection of the wirings of the touch function layer in the region on the upper surface of the region to a surface area of the upper surface of the region.

Figure 1:
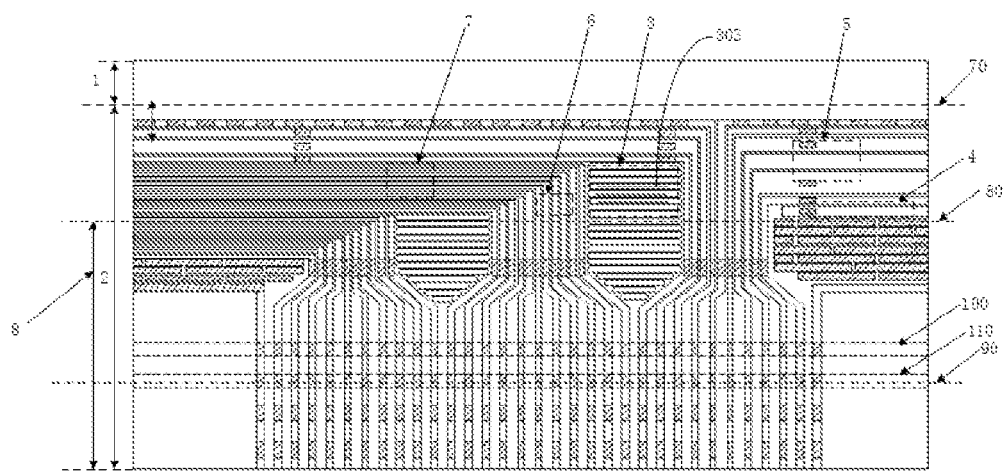
FIG. 1 illustrates a schematic diagram of wirings of a touch function layer in a first region and in multiple regions of a touch display panel according to an embodiment of the present disclosure.
Figure 2:
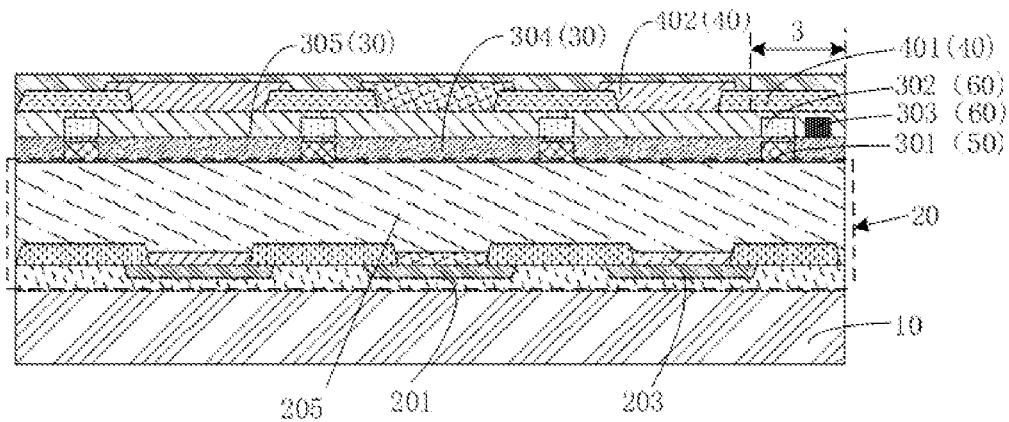
FIG. 2 illustrates a schematic diagram of a first section of the touch display panel according to an embodiment of the present disclosure.
Figure 3:
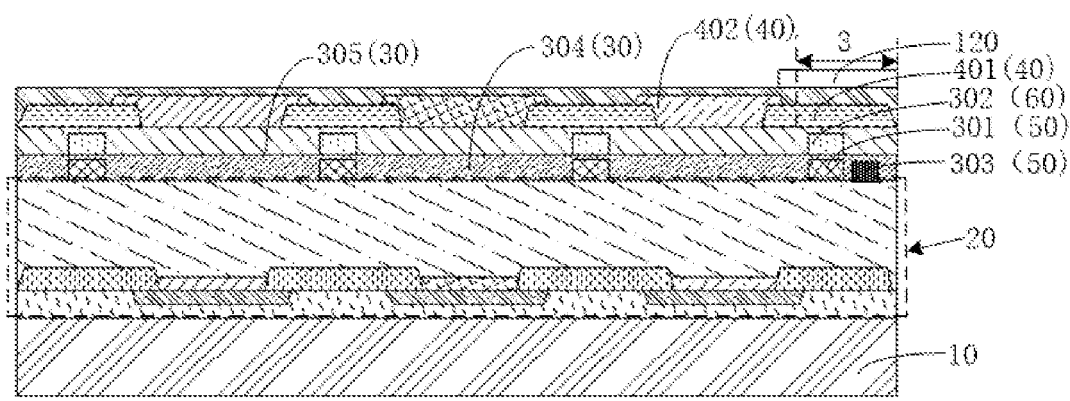
FIG. 3 illustrates a schematic diagram of a second section of the touch display panel according to an embodiment of the present disclosure.

As shown in FIG. 1, FIG. 2 and FIG. 3, a touch display panel is provided in the present disclosure, and the touch display panel includes a first region 3 located in a non-display region, and the touch display panel further includes a substrate 10, a display function layer 20, a touch function layer 30 and a color filter layer 40. Specifically, the display function layer 20 includes an array layer 201, a light-emitting function layer 203, and an encapsulation layer 205 disposed on the substrate 10. The touch function layer 30 is disposed on a side of the display function layer 20 away from the substrate 10, and includes first touch wirings 50 and second touch wirings 60 disposed on different layers, and the first region 3 is provided with the first touch wirings 301 and the second touch wirings 302. The color filter layer 40 is disposed on a side of the touch function layer 30 away from the substrate 10, and includes black matrixes 401 disposed at intervals, and the first region 3 is covered with the black matrixes 401. The touch function layer 30 is provided with compensation wirings 303, the compensation wirings 303 are disposed on the first region 3, and a wiring density of the touch function layer 30 in the first region 3 is in a range of 60% to 90%.

In an embodiment, the touch function layer 30 further includes a first insulation layer 304 disposed on a side of the first touch wirings 50 away from the substrate 10, the second touch wirings 60 disposed on a side of the first insulation layer 304 away from the substrate 10, and a second insulation layer 305 disposed on a side of the second touch wirings 60 away from the substrate 10.

In an embodiment, wiring directions of the first touch wirings and the second touch wirings are both turned from a horizontal direction to a vertical direction in the first region.

In an embodiment, the color filter layer 40 further includes color resists 402 each disposed between adjacent two black matrixes 401.

In can be understood that taking a display region boundary 70 and an ink boundary 80 shown in FIG. 1 as examples for explanation. Specifically, a boundary of a side of an ink layer close to the display region is the ink boundary 80, a boundary of the black matrixes 401 away from the display region is a black matrix boundary 90. For an region provided with the ink layer, a problem of dark lines generated under an off-screen state is not existed due to a good shading effect of the ink layer to a wiring of the touch function layer below, and the first region 3 only provided with the black matrixes 401 needs to adding the compensation wirings 303 to improve the wiring density of the touch function layer 30 in the first region 3, thus making the wiring density of the touch function layer 30 in the first region 3 being in a range of 60% to 90%, reducing the dark lines generated under the off-screen state in the first region.

In the embodiment, the compensation wirings 303 can increase the wiring density of the touch function layer 30 in the first region 3 by adding the compensation wirings 303 on the touch function layer 30 in the first region 3, thus a range of the wiring density of the first region 3 is within ranges of wiring densities of adjacent other regions, that is, the range of the wiring density of the first region 3 is in the range of 60% to 90%, so as to reduce the dark lines caused by a large difference between the wiring density of the first region 3 and the wiring densities of the adjacent other regions, and alleviate the technical problem of the dark lines generated in the first region 3 under the off-screen state in the existing touch display panels.

The technical solutions of the present disclosure will be described in conjunction with specific embodiments bellow.

The embodiments of the present disclosure are described by using a touch display panel with polarizer removed as an example, since the touch display panel blocks the lower touch wiring through the black matrixes 401 of the color filter layer 40, the dark lines generated under the off-screen state in the first region 3 caused by a poor shading effect of the black matrixes 401; for the display panel with the dark lines caused by reflective wiring below under the off-screen state, the inventive concept of the present disclosure is also applicable.

It should be noted that the first region of the present disclosure is only covered with the black matrixes, and is not covered with the ink layer. Multiple regions are disposed around the first region and are only covered with the black matrixes, meanwhile, wiring densities of the touch function layer in the multiple regions are quite different, for example, a wiring density of the touch function layer in the third region is large, and a wiring density of the touch function layer in the fifth region is small.

Since the first region needs to avoid a large difference between the wiring density of the touch function layer in the first region and a wiring density of the touch function layer in each of the multiple regions, and the wiring densities of the touch function layer in the multiple regions are in a range of 60% to 90%, a range of the wiring density of the touch function layer in the first region is same as the ranges of the wiring densities of the touch function layer in the multiple regions, which can avoid the large difference between the wiring density of the touch function layer in the first region and the wiring density of the touch function layer in anyone of the multiple regions, so as to avoid the obvious dark lines generated in the first region under the off-screen state.

In an embodiment, as shown in FIG. 1, the touch display panel includes first dams 100 and second dams 110 located in the non-display region, the first dams 100 and the second dams 110 are configured to block overflow of a flat layer material and an encapsulation layer material to the outside of the panel during a preparation process, and the black matrix boundary 90 is located between adjacent two second dams 110.

In an embodiment, the touch display panel further includes the multiple regions disposed around the first region 3, a difference between the wiring densities of the touch function layer in each of the multiple regions and in the first region is smaller than 30%, and the wiring density of the touch function layer 30 in the first region 3 is equal to an average value of the wiring densities of the touch function layer 30 in the multiple regions.

It can be understood that the removal of dark lines is most effective when the wiring density of the touch function layer 30 in the first region 3 is equal to the average value of the wiring densities of the touch function layer 30 in the adjacent multiple regions.

It should be noted that since the dark lines are determined by whether the human eye sees abnormalities, and the human eyes cannot determine the dark lines when a difference between the wiring densities of the touch function layer is smaller than 30%, in other words, when the wiring density of the touch function layer 30 in the first region is in a range of 60% to 90%, and this range is within the ranges of the wiring densities of the touch function layer 30 in the adjacent multiple regions, which can reduce the dark lines of the first region 3 under the off-screen state.

In the embodiment, the wiring density of the touch function layer 30 in the first region 3 is equal to the average value of the wiring densities of the touch function layer 30 in the adjacent multiple regions, thereby further reducing the dark lines in the first region 3.

In an embodiment, the wiring densities of the touch function layer in the multiple regions are in a range of 60% to 90%.

It can be understood that differences between wiring densities of the touch function layer in the multiple regions are smaller than 30%, thus the human eyes cannot see the abnormal dark lines.

In an embodiment, at least one of the number of wirings, widths of wirings, or spacing of wirings of the touch function layer 30 in the first region 3 are the same as that of the touch function layer 30 in the plurality of regions.

In an embodiment, as shown in FIG. 1, the multiple regions include a second region 4, a third region 5, a fourth region 6 and a fifth region 7, and a wiring density of the touch function layer 30 in the second region 4 is 70.7%, a wiring density of the touch function layer 30 in the third region 5 is 85.8%, a wiring density of the touch function layer 30 in the fourth region 6 is 73.6%, and a wiring density of the touch function layer 30 in the fifth region 7 is 60%.

In an embodiment, the wiring density of the touch function layer 30 in the first region 3 is 67.10%.

Specifically, a range size of the wiring densities of the touch function layer 30 in the multiple regions include a range size of the wiring density of the touch function layer 30 in the first region 3.

Specifically, the wiring densities of the touch function layer 30 in the multiple regions can be in a range of 60% to 90%.

It can be understood that for the second region 4, the third region 5, the fourth region 6 and the fifth region 7 without providing with the compensation wirings 303, the wiring density of the touch function layer 30 is determined by the number of wirings, widths of the wirings, or spacing of the wirings of the first touch wirings 301 and the second touch wirings 302, and the number of wirings and the widths of wrings of the touch function layer 30 are determined by a size and a touch specification of the touch function layer 30, metal wirings need to fill the display region 1, and the spacing of wirings of the touch function layer 30 are determined by process capability and electrical characteristics. When a size, a touch specification, a process capability and an electrical characteristic of the display panel are determined, a number of wirings, widths of wirings and spacing of wirings of the second region 4, the third region 5, the fourth region 6 and the fifth region 7 are determined, that is, the wiring densities of the touch function layer 30 of the second region 4, the third region 5, the fourth region 6 and the fifth region 7 are determined.

It should be noted that the multiple regions are regions with a large difference of the ranges of the wiring densities around the first region 3, a minimum of the range of the wiring density of the touch function layer 30 in the first region 3 is larger than a minimum of the wiring densities of the touch function layer 30 in the multiple regions, and a maximum of the range of the wiring density of the touch function layer 30 in the first region 3 is smaller than a maximum of the wiring densities of the touch function layer 30 in the multiple regions, which makes a range of the wiring density of the touch function layer 30 in the first region 3 within a range of wiring densities of adjacent multiple regions, and thus reduces a difference between the wiring densities of the touch function layer 30 in the first region 3 and in the adjacent multiple regions, so as to reduce the dark lines under the off-screen state.

In the embodiment, the wiring densities of the touch function layer 30 of the second region 4, the third region 5, the fourth region 6 and the fifth region 7 are determined, thereby regulating the wiring density of the touch function layer 30 in the first region 3 better, and making the wiring density of the touch function layer 30 in the first region 3 tend to be the same as the average value of the wiring densities of the touch function layer 30 in the adjacent multiple regions.

In an embodiment, as shown in FIG. 2 and FIG. 3, the compensation wirings 303 are disposed at the same layer as the first touch wirings 50, or the compensation wirings 303 are disposed at the same layer as the second touch wirings 60.

Specifically, a preparation material of the compensation wirings 303 is the same as a preparation material of the first touch wirings 50, or the preparation material of the compensation wirings 303 is the same as a preparation material of the second touch wirings 60.

It can be understood that the compensation wirings 303 are disposed at the same layer as the first touch wirings 50 or the second touch wirings 60 of the touch function layer 30, which can simplify a process for preparing the compensation wiring 303, and reduce costs.

In an embodiment, two ends of the compensation wiring 303 are configured to be in a disconnection state, and the compensation wirings 303 are disposed at intervals with the first touch wirings 301 and the second touch wirings 302.

It can be understood that the compensation wirings 303 may not be connected to a signal and two ends of the compensation wirings 303 are configured to be in a disconnection state, that is the compensation wirings 303 are only disposed on the first region 3 to increase the wiring density of the touch function layer 30 in the first region 3.

In the embodiment, the compensation wirings 303 are only used to increase the wiring density of the touch function layer 30 in the first region 3, only a photomask of the first touch wirings 50 or the second touch wirings 60 needs to be improved, which has a simple process and low costs.

In an embodiment, the non-display region includes a lower bezel region 2, and the lower bezel region 2 includes the first region 3 and an ink region 8, the first region 3 is disposed on a side of the ink region 8 facing towards the display region 1, specifically, the ink region 8 is provided with the ink layer, and the ink layer is disposed outside the first region 3.

It can be understood that since a preparation material of the ink layer is ink, and the ink has a better shading property, regions covered by the ink layer do not exist a problem of the dark lines generated in the off-screen state. However, the ink layer is not disposed on the first region 3, and only the black matrixes 401 are disposed on the first region 3 to shade the light, therefore, the compensation wirings 303 need to be added on the first region 3 to make the wiring density of the touch function layer 30 in the first regions 3 tend to be the same as the average value of the wiring densities of the touch function layer 30 in the adjacent multiple regions, so as to reduce the dark lines in the first region 3 under the off-screen state.

In an embodiment, the touch display panel further includes a light blocking layer, and the light blocking layer at least covers the first region.

Specifically, the light blocking layer can be an additional layer, and the light blocking layer is disposed on a side of the touch function layer 30 away from the substrate 10.

Specifically, the light blocking layer can be obtained by an existing shading film layer extending to the first region 3, that is, it is not need to add a process to individually prepare the light blocking layer.

It can be understood that a shading effect of the first region is poor, which causes the dark lines under the off-screen state, then a light blocking layer is additionally disposed, and the light blocking layer is configured to reduce reflection of the first region 3 under the off-screen state, and improve the shading effect for the first region 3, so as to overcome a defeat of a poor shading effect caused by only disposing the black matrixes 401 in the first region 3, and improve the shading effect for the first region 3.

In the embodiment, the shading effect for the first region 3 is increased by additionally disposing the light blocking layer, or extending the existing shading film layer to the first region 3 to form the light blocking layer, thus reducing the dark lines of the first region 3 under the off-screen state.

In an embodiment, a transmittance of the light blocking layer is smaller than a transmittance of each of the black matrixes 401.

In an embodiment, the black matrixes 401 include a first part located in the display region 1, and a second part located in the first region 3.

Specifically, a thickness of the second part is larger than a thickness of the first part.

It can be understood that the thickness of the second part in the first region 3 is added, thereby improving the shading effect of the black matrixes 401 in the first region 3, and reducing the dark lines of the first region 3 under the off-screen state.

A touch display device and a terminal device are provided in the present disclosure, both the touch display device and the terminal device include the above touch display panel, and not to be repeated here.

The touch display panel provided in the embodiments of the present disclosure includes the substrate, the display function layer, the touch function layer and the color filter layer. The display function layer includes the array layer, the light-emitting layer and the encapsulation layer disposed on the substrate. The touch function layer is disposed on the side of the display function layer away from the substrate, the touch function layer includes the first touch wirings and the second touch wirings disposed on different layers, and the first region is provided with the first touch wirings and the second touch wirings. The color filter layer is disposed on the side of the touch function layer away from the substrate, the color filter layer includes the black matrixes disposed at intervals, and the first region is covered by the black matrixes. Specifically, the touch function layer is further provided with the compensation wirings, the compensation wirings are disposed in the first region, and the wiring density of the touch function layer in the first region is in a range of 60% to 90%. The compensation wirings are additionally disposed on the touch function layer in the first region to increase the wiring density of the touch function layer in the first region, so that the range of the wiring density in the first region is within the ranges of the wiring densities in the adjacent other regions, that is, the range of the wiring density in the first region is in the range of 60% to 90%, so as to reduce the dark lines generated by the large difference between the wiring densities in the first region and in the adjacent other regions, and alleviate the technical problem of the dark lines generated in the first region under the off-screen state in the existing touch display panels.

In the above embodiments, the description for each embodiment has its own emphasis, for parts not detailed in a certain embodiment, please refer to the relevant descriptions of other embodiments.

The touch display panel and the touch display device provided in the embodiments of the present disclosure are described in detail above, the principle and embodiments of the present disclosure are expounded by using specific examples in this paper, and the above description of the embodiments is merely used to help understand the methods and core ideas of the present disclosure. Meanwhile, for those skilled in the art, there may be changes in the specific implementation methods and application scope based on the ideas of the present disclosure. In summary, the content of the specification should not be understood as a limitation of the present disclosure.

What is claimed is:

1. A touch display panel, comprising: a display region and a non-display region, wherein the non-display region comprises a lower bezel region, the lower bezel region comprises a first region and an ink region, the first region is disposed on a side of the ink region facing towards the display region, and wherein the touch display panel comprises:
a substrate;
a display function layer comprising all of an array layer, a light-emitting function layer, and an encapsulation layer disposed on the substrate;
a touch function layer disposed on a side of the display function layer away from the substrate, wherein the touch function layer comprises first touch wirings and second touch wirings disposed at a different layer than the first touch wirings, and the first region is provided with the first touch wirings and the second touch wirings; and
a color filter layer disposed on a side of the touch function layer away from the substrate, wherein the color filter layer comprises black matrixes arranged at intervals, and the first region is covered with the black matrixes;
wherein the touch function layer is further provided with compensation wirings, the compensation wirings are disposed in the first region, and a wiring density percentage of the touch function layer in the first region is in a range of 60% to 90%;
wherein the touch display panel further comprises: a plurality of regions disposed around the first region, wherein a difference between a wiring density percentage of the touch function layer in each of the plurality of regions and the wiring density percentage of the touch function layer in the first region is smaller than 30%, wiring density percentages of the touch function layer in the plurality of regions are in a range of 60% to 90% and are not equal to each other, and the wiring density percentage of the touch function layer in the first region is equal to an average value of the wiring density percentages of the touch function layer in the plurality of regions; and
wherein the wiring density percentage of the touch function layer in the first region is a total wiring area of the first region/a total available area of the first region, and the wiring density percentage of the touch function layer in each of the plurality of regions is a total wiring area of the each of the plurality of regions/a total available area of the each of the plurality of regions.

2. The touch display panel according to claim 1, wherein at least one of the number of wirings, widths of the wirings, or spacing of the wirings of the touch function layer in the first region is the same as that of the touch function layer in the plurality of regions.

3. The touch display panel according to claim 2, wherein the plurality of regions comprise a second region, a third region, a fourth region, and a fifth region, wherein a wiring density percentage of the touch function layer in the second region is 70.7%, a wiring density percentage of the touch function layer in the third region is 85.8%, a wiring density percentage of the touch function layer in the fourth region is 73.6%, and a wiring density percentage of the touch function layer in the fifth region is 60%; and wherein the wiring density percentage of the touch function layer in the second region is a total wiring area of the second region/a total available area of the second region, the wiring density percentage of the touch function layer in the third region is a total wiring area of the third region/a total available area of the third region, the wiring density percentage of the touch function layer in the fourth region is a total wiring area of the fourth region/a total available area of the fourth region, and the wiring density percentage of the touch function layer in the fifth region is a total wiring area of the fifth region/a total available area of the fifth region.

4. The touch display panel according to claim 1, wherein the compensation wirings are disposed at the same layer as the first touch wirings or the second touch wirings.

5. The touch display panel according to claim 4, wherein two ends of each of the compensation wirings are configured to be in a disconnection state, and the compensation wirings are disposed at intervals with the first touch wirings and the second touch wirings.

6. The touch display panel according to claim 1, wherein the ink region is provided with an ink layer disposed outside the first region.

7. The touch display panel according to claim 6, further comprising:
a light blocking layer at least covering the first region.

8. The touch display panel according to claim 7, wherein a transmittance of the light blocking layer is smaller than that of each of the black matrixes.

9. A touch display device, comprising a touch display panel, comprising: a display region and a non-display region, wherein the non-display region comprises a lower bezel region, the lower bezel region comprises a first region and an ink region, the first region is disposed on a side of the ink region facing towards the display region, and wherein the touch display panel comprises:
a substrate;
a display function layer comprising all of an array layer, a light-emitting function layer, and an encapsulation layer disposed on the substrate;
a touch function layer disposed on a side of the display function layer away from the substrate, wherein the touch function layer comprises first touch wirings and second touch wirings disposed at a different layer than the first touch wirings, and the first region is provided with the first touch wirings and the second touch wirings; and a color filter layer disposed on a side of the touch function layer away from the substrate, wherein the color filter layer comprises black matrixes arranged at intervals, and the first region is covered with the black matrixes;
wherein the touch function layer is further provided with compensation wirings, the compensation wirings are disposed in the first region, and a wiring density percentage of the touch function layer in the first region is in a range of 60% to 90%;
wherein the touch display panel further comprises: a plurality of regions disposed around the first region, wherein a difference between a wiring density percentage of the touch function layer in each of the plurality of regions and the wiring density percentage of the touch function layer in the first region is smaller than 30%, wiring density percentages of the touch function layer in the plurality of regions are in a range of 60% to 90% and are not equal to each other, and the wiring density percentage of the touch function layer in the first region is equal to an average value of the wiring density percentages of the touch function layer in the plurality of regions; and
wherein the wiring density percentage of the touch function layer in the first region is a total wiring area of the first region/a total available area of the first region, and the wiring density percentage of the touch function layer in each of the plurality of regions is a total wiring area of the each of the plurality of regions/a total available area of the each of the plurality of regions.

10. The touch display device according to claim 9, wherein at least one of the number of wirings, widths of the wirings, or spacing of the wirings of the touch function layer in the first region is the same as that of the touch function layer in the plurality of regions.

11. The touch display device according to claim 10, wherein
the plurality of regions comprise a second region, a third region, a fourth region, and a fifth region, wherein a wiring density percentage of the touch function layer in the second region is 70.7%, a wiring density percentage of the touch function layer in the third region is 85.8%, a wiring density percentage of the touch function layer in the fourth region is 73.6%, and a wiring density percentage of the touch function layer in the fifth region is 60%; and
wherein the wiring density percentage of the touch function layer in the second region is a total wiring area of the second region/a total available area of the second region, the wiring density percentage of the touch function layer in the third region is a total wiring area of the third region/a total available area of the third region, the wiring density percentage of the touch function layer in the fourth region is a total wiring area of the fourth region/a total available area of the fourth region, and the wiring density percentage of the touch function layer in the fifth region is a total wiring area of the fifth region/a total available area of the fifth region.

12. The touch display device according to claim 9, wherein the compensation wirings are disposed at the same layer as the first touch wirings or the second touch wirings.

13. The touch display device according to claim 12, wherein two ends of each of the compensation wirings are configured to be in a disconnection state, and the compensation wirings are disposed at intervals with the first touch wirings and the second touch wirings.

14. The touch display device according to claim 9, wherein the ink region is provided with an ink layer disposed outside the first region.

15. The touch display device according to claim 14, wherein the touch display panel further comprises:
a light blocking layer at least covering the first region.

16. The touch display device according to claim 15, wherein a transmittance of the light blocking layer is smaller than that of each of the black matrixes.

17. A touch display panel, comprising: a display region and a non-display region, wherein the non-display region comprises a lower bezel region, the lower bezel region comprises a first region and an ink region, the first region is disposed on a side of the ink region facing towards the display region, and wherein the touch display panel comprises:
a substrate;
a display function layer comprising all of an array layer, a light-emitting function layer, and an encapsulation layer disposed on the substrate;
a touch function layer disposed on a side of the display function layer away from the substrate, wherein the touch function layer comprises first touch wirings and second touch wirings disposed at a different layer than the first touch wirings, and the first region is provided with the first touch wirings and the second touch wirings; and
a color filter layer disposed on a side of the touch function layer away from the substrate, wherein the color filter layer comprises black matrixes arranged at intervals, and the first region is covered with the black matrixes;
wherein the touch function layer is further provided with compensation wirings, the compensation wirings are disposed in the first region, and a wiring density percentage of the touch function layer in the first region is in a range of 60% to 90%;
wherein the ink region is provided with an ink layer disposed outside the first region;
wherein the touch display panel further comprises a light blocking layer at least covering the first region; and
wherein a transmittance of the light blocking layer is smaller than that of each of the black matrixes; and
wherein the wiring density percentage of the touch function layer in the first region is a total wiring area of the first region/a total available area of the first region.

18. A touch display device, comprising the touch display panel of claim 17.

* * * * *